(12) United States Patent
Arai et al.

(10) Patent No.: US 6,779,642 B2
(45) Date of Patent: Aug. 24, 2004

(54) LUBRICATING STRUCTURE OF HYDRAULIC CLUTCH

(75) Inventors: Yasunori Arai, Wako (JP); Yoichiro Yamamoto, Wako (JP); Masaki Inoue, Wako (JP); Keiichi Takahashi, Wako (JP); Yuji Yamamoto, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/320,470

(22) Filed: Dec. 17, 2002

(65) Prior Publication Data

US 2003/0155206 A1 Aug. 21, 2003

(30) Foreign Application Priority Data

Feb. 20, 2002 (JP) .................................... P2002-043768

(51) Int. Cl.[7] .............................................. F16D 25/12
(52) U.S. Cl. ............................. 192/70.12; 192/113.34
(58) Field of Search .......................... 192/70.12, 113.34, 192/85 AA, 85 CA (56) References Cited

U.S. PATENT DOCUMENTS

| | | | |
|---|---|---|---|
| 3,145,816 A | * 8/1964 | De Lorean et al. | 192/113.34 |
| 3,202,253 A | 8/1965 | Merritt et al. | |
| 3,744,606 A | 7/1973 | Bucksch | |
| 4,313,533 A | 2/1982 | Aschauer | |
| 4,446,953 A | 5/1984 | Voss et al. | |
| 4,529,073 A | * 7/1985 | Lewis | 192/70.12 |
| 4,566,572 A | 1/1986 | Flotow et al. | |
| 4,966,269 A | * 10/1990 | Raab et al. | 192/70.16 |
| 5,720,372 A | * 2/1998 | Shino et al. | 192/70.12 |
| 6,401,896 B1 | * 6/2002 | Schnepf | 192/70.12 |

FOREIGN PATENT DOCUMENTS

| | | |
|---|---|---|
| JP | 05-098416 | 4/1993 |
| JP | 05-141446 | 6/1993 |
| JP | 2553818 | 8/1996 |
| JP | 09-303422 | 11/1997 |
| JP | 2794521 | 6/1998 |
| JP | 3057478 | 4/2000 |

OTHER PUBLICATIONS

Patent Abstracts of Japan No. 07–054866 dated Feb. 28, 1995 /Corresponds to AC.
Patent Abstracts of Japan No. 09–042317 dated Feb. 10, 1997 /Corresponds to AD/Discussed in the specification.
Patent Abstracts of Japan No. 07–133830 dated May. 23, 1995 /Corresponds to AF.

* cited by examiner

*Primary Examiner*—Rodney H. Bonck
(74) *Attorney, Agent, or Firm*—Westerman, Hattori, Daniels & Adrian, LLP (57) ABSTRACT

A lubricating structure of a hydraulic clutch including a drum-shaped clutch housing connected to an input shaft, and a clutch hub connected to an output shaft coaxial with the input shaft. The clutch hub has a cylindrical portion and a flange formed integrally with the cylindrical portion near one end of the cylindrical portion. The lubricating structure of the hydraulic clutch further includes a clutch piston for making pressure contact of first and second clutch plates respectively mounded to the clutch housing and the clutch hub and a hydraulic pump provided on the opposite side of the first and second clutch plates with respect to the clutch piston. The cylindrical portion of the clutch hub is formed with a plurality of first lubricating oil passages passing through the cylindrical portion, and the flange of the clutch hub is formed with a plurality of second lubricating oil passages passing through the flange.

8 Claims, 11 Drawing Sheets

LUBRICATING STRUCTURE OF HYDRAULIC CLUTCH

BACKGROUND OF THE INVENTION

1. Field of the Invention

The present invention relates generally to a lubricating structure of a hydraulic clutch, and more particularly to a lubricating structure for supplying a lubricating oil from a hydraulic pump to clutch plates in a hydraulic clutch for allowing the transmission of power between a first rotating shaft and a second rotating shaft.

2. Description of the Related Art

In general, a lubricating oil is sealed in a speed reducer or the like having a hydraulic clutch to reduce frictional resistances at a rotating portion and a sliding portion and prevent heating, seizure, corrosion, etc. Unless the lubricating oil is sufficiently supplied to all clutch elements, the above problem including seizure may arise. Japanese Patent Laid-open No. Hei 9-42317 discloses a lubricating structure for supplying a lubricating oil from a hydraulic pump driven by a first rotating shaft (input shaft) to clutch plates in a hydraulic clutch for allowing the transmission of power between the first rotating shaft and a second rotating shaft (output shaft).

In the lubricating structure disclosed in this publication, a lubricating oil passage for introducing the lubricating oil from the hydraulic pump to the hydraulic clutch is formed between the inner circumference of a pump driving member for driving the hydraulic pump and the outer circumference of the second rotating shaft. According to this structure, it is not necessary to form a lubricating oil passage inside the second rotating shaft, so that a working cost can be reduced and the sectional area of the lubricating oil passage can be increased to thereby enhance the lubricating effect of the hydraulic clutch. However, this structure has a problem such that it is difficult to uniformly supply the lubricating oil to all the clutch plates engaged by splines with the outer circumference of a cylindrical clutch hub and the inner circumference of a clutch housing, because the lubricating oil from the lubricating oil passage is supplied to the inside of the clutch hub.

Another clutch structure of a hydraulic clutch having a plurality of slits has been proposed. The slits are formed in a flange and a cylindrical portion of the clutch hub so as to be spaced in the circumferential direction for the purpose of uniformly supplying the lubricating oil to all the clutch plates. This lubricating structure has exhibited an effect to some extent, but cannot achieve the primary purpose of uniformly distributing the lubricating oil to all the clutch plates.

More specifically, when the hydraulic clutch is engaged, the clutch hub is rotated, so that the lubricating oil supplied is scattered through the slits of the cylindrical portion of the clutch hub to the outer circumference thereof by a centrifugal force. As a result, the lubricating oil reaching the slits of the flange is greatly limited, and the clutch plates especially about the flange cannot therefore be sufficiently lubricated.

SUMMARY OF THE INVENTION

It is therefore an object of the present invention to provide a lubricating structure of a hydraulic clutch which can supply a lubricating oil uniformly and sufficiently to all the clutch plates.

In accordance with an aspect of the present mention, there is provided a lubricating structure of a hydraulic clutch including a drum-shaped clutch housing connected to a first rotating shaft, the clutch housing having a first spline formed on the inner circumference thereof; a clutch hub connected to a second rotating shaft coaxial with the first rotating shaft, the clutch hub having a cylindrical portion having a first end and a second end, a flange formed integrally with the cylindrical portion near the first end, and a second spline formed on the outer circumference of the cylindrical portion; a plurality of first clutch plates axially slidably engaged with the first spline of the clutch housing; a plurality of second clutch plates axially slidably engaged with the second spline of the clutch hub; clutch engaging means for engaging the first and second clutch plates with each other; and lubricating oil supplying means for supplying a lubricating oil into an internal space defined inside of the cylindrical portion of the clutch hub from the side of the second end; the cylindrical portion of the clutch hub having a plurality of first lubricating oil passages for radially outwardly introducing the lubricating oil from the inner circumference of the cylindrical portion to the outer circumference thereof; the flange of the clutch hub having a plurality of second lubricating oil passages for axially introducing the lubricating oil from the internal space toward the first end of the cylindrical portion.

With the above lubricating structure, the lubricating oil from the lubricating oil supplying means is scattered radially outward by the centrifugal force of the rotating clutch hub to collide with the inner circumference of the cylindrical portion of the clutch hub and be diffused therealong, and a part of this lubricating oil is supplied through the first lubricating oil passages formed through the cylindrical portion to the clutch plates mounted on the cylindrical portion of the clutch hub.

The remaining lubricating oil is supplied through the second lubricating oil passages formed through the flange to the back side of the flange, and is next supplied through the first end of the cylindrical portion to the clutch plates mounted about the flange of the clutch hub. Accordingly, the lubricating oil can be sufficiently supplied also to the clutch plates about the flange where the supply of the lubricating oil is insufficient in the prior art. As a result, a sufficient amount of lubricating oil can be uniformly supplied to all the clutch plates.

Preferably, the clutch hub is formed of sintered metal. Accordingly, the dimensional accuracy of the clutch hub can be improved, and the first and second lubricating oil passages can be easily formed. More preferably, the cylindrical portion of the clutch hub further has a plurality of third lubricating oil passages for radially outwardly introducing the lubricating oil passed through the second lubricating oil passages to the outer circumference of the cylindrical portion.

The ratio of the area of the first lubricating oil passages to the area of the inner circumferential surface of the cylindrical portion on the side of the second end with respect to the flange is smaller than the ratio of the area of the third lubricating oil passages to the area of the inner circumferential surface of the cylindrical portion on the side of the first end with respect to the flange. With this configuration, a sufficient amount of lubricating oil can be uniformly supplied to all the clutch plates.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
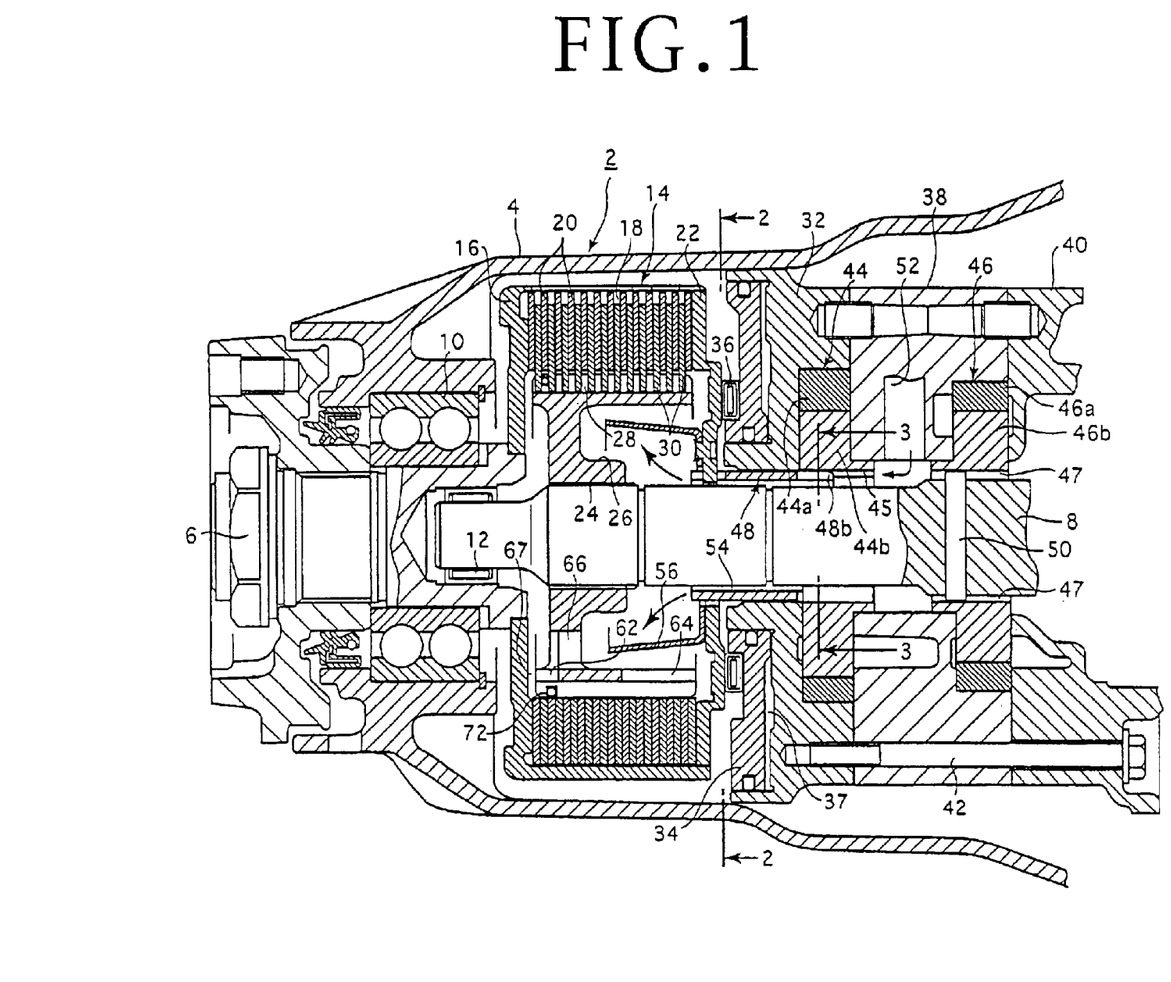
FIG. 1 is a vertical sectional view of a power transmitting device adopting the lubricating structure of the hydraulic clutch according to the present invention.
Figure 2:
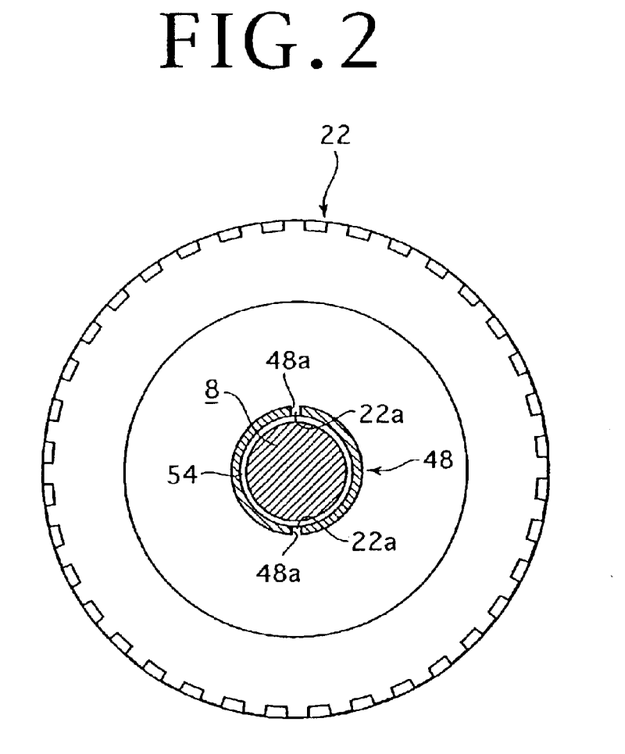
FIG. 2 is a cross section taken along the line 2—2 in FIG. 1.
Figure 3:
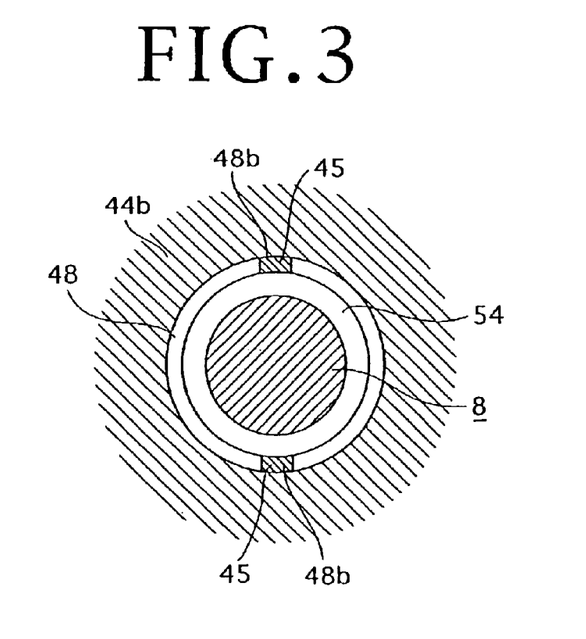
FIG. 3 is a cross section taken along the line 3—3 in FIG. 1.

Some preferred embodiments of the present invention will now be described in detail with reference to the drawings. Referring to FIG. 1, there is shown a sectional view of a power transmitting device 2 mounted on a four-wheel drive vehicle. The power transmitting device 2 is provided between front wheels full-time driven by an engine and rear wheels to which a part of a drive force for the front wheels is part-time transmitted, wherein the power transmission from the front wheels to the rear wheels is controlled to switch between a four-wheel drive condition and a front-wheel drive condition.

The power transmitting device 2 has a casing 4 to which an input shaft (first rotating shaft) 6 connected to the front wheels and an output shaft (second rotating shaft) 8 connected to the rear wheels are coaxially supported. The input shaft 6 is rotatably supported through a ball bearing 10 to the casing 4, and the front end of the output shaft 8 is engaged with the rear end of the input shaft 6 so that relative rotation is allowed by a needle bearing 12. Reference numeral 14 generally denotes a hydraulic clutch provided in the casing 4. The hydraulic clutch 14 includes a drum-shaped clutch housing 16 welded to the rear end of the input shaft 6. A spline 18 is formed on the inner circumference of the clutch housing 16, and a plurality of clutch plates 20 are engaged with the spline 18 so as to be axially slidable and circumferentially nonrotatable. A pressure plate 22 is engaged with the rear end (right end as viewed in FIG. 1) of the spline 18 so as to be axially slidable and circumferentially nonrotatable.

A clutch hub 26 is fixed through a spline 24 to the front end (left end as viewed in FIG. 1) of the output shaft 8. A spline 28 is formed on the outer circumference of the clutch hub 26, and a plurality of clutch plates 30 are engaged with the spline 28 so as to be axially slidable and circumferentially nonrotatable. The clutch plates 20 supported to the clutch housing 16 and the clutch plates 30 supported to the clutch hub 26 are alternately arranged so as to be mutually abuttable.

A front plate 32 is provided on the rear side of the hydraulic clutch 14, and a clutch piston 34 is engaged with the front plate 32 so as to be axially slidable. The front surface of the clutch piston 34 is in abutment against the pressure plate 22 through a thrust bearing 36. An operating oil pressure chamber 37 is defined between the front plate 32 and the clutch piston 34. When an oil pressure is applied to the operating oil pressure chamber 37, the pressure plate 22 is moved forward through the clutch piston 34 and the thrust bearing 36 to thereby make the abutment of the clutch plates 20 and 30. Accordingly, the rotation of the input shaft 6 is transmitted through the clutch housing 16, the spline 18, the clutch plates 20, the clutch plates 30, the spline 28, the clutch hub 26, and the spline 24 to the output shaft 8, so that the drive force for the front wheels is distributed to the rear wheels.

A central plate 38 is provided on the rear surface of the front plate 32, and a rear plate 40 is provided on the rear surface of the central plate 38. The plates 32, 38, and 40 are integrated together by a bolt 42. A first hydraulic pump 44 is interposed between the rear surface of the front plate 32 and the front surface of the central plate 38. The first hydraulic pump 44 is a trochoid pump, which is composed of an outer rotor 44a having internal teeth and an inner rotor 44b having external teeth. The internal teeth of the outer rotor 44a and the external teeth of the inner rotor 44b mesh with each other. Similarly, a second hydraulic pump 46 is interposed between the rear surface of the central plate 38 and the front surface of the rear plate 40. The second hydraulic pump 46 is also a trochoid pump, which is composed of an outer rotor 46a having internal teeth and an inner rotor 46b having external teeth. The internal teeth of the outer rotor 46a are in mesh with the eternal teeth of the inner rotor 46b.

Figure 4:
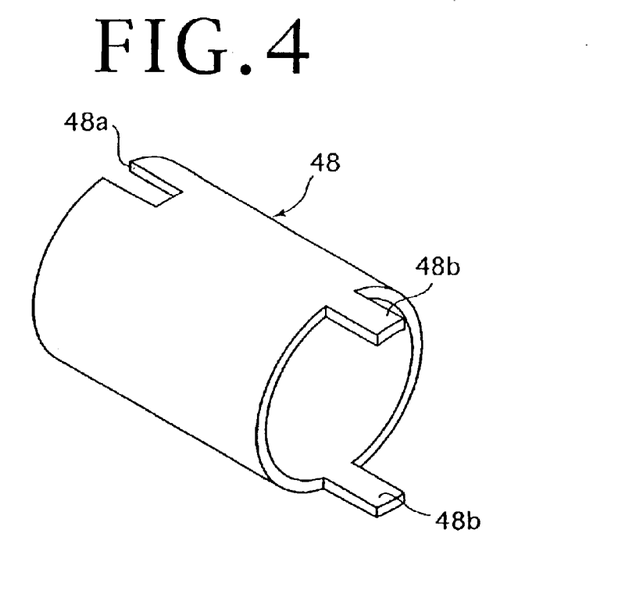
FIG. 4 is a perspective view of a pump driving member.

As apparent from FIG. 1 and FIGS. 2 to 4 in combination, a substantially cylindrical pump driving member 48 is rotatably provided between the outer circumference of the output shaft 8 and the inner circumference of the front plate 32. As shown in FIG. 4, two recesses 48a (one of which being shown) are formed on the front end of the pump driving member 48. The two recesses 48a are respectively engaged with two projections 22a formed on the inner circumference of the pressure plate 22.

On the other hand, two projections 48b are formed on the rear end of the pump driving member 48. The two projections 48b are respectively engaged with two recesses 45 formed on the inner circumference of the inner rotor 44b of the first hydraulic pump 44. Accordingly, the rotation of the input shaft 6 is transmitted through the clutch housing 16, the spline 18, the pressure plate 22, and the pump driving member 48 to the inner rotor 44b of the first hydraulic pump 44, so that the first hydraulic pump 44 is driven at the same rotational speed as that of the input shaft 6.

Referring again to FIG. 1, a pin 50 extends through the output shaft 8 along the diameter thereof. The opposite ends of the pin 50 are engaged with two recesses 47 formed on the inner circumference of the inner rotor 44b of the second hydraulic pump 46. Accordingly, the rotation of the output shaft 8 is transmitted through the pin 50 to the inner rotor 46b of the second hydraulic pump 46, so that the second hydraulic pump 46 is driven at the same rotational speed as that of the output shaft 8.

Although not shown, a control valve for switching oil passages communicating with the first and second hydraulic pumps 44 and 46 and a relief valve for discharging an extra oil are accommodated inside the central plate 38. The central plate 38 is formed with a lubricating oil port 52 opposed to the outer circumference of the output shaft 8. A part of the extra oil discharged from the relief valve is supplied as a lubricating oil to the lubricating oil port 52.

A lubricating oil passage 54 is formed between the outer circumference of the output shaft 8 and the inner circumference of the pump driving member 48. The rear end of the lubricating oil passage 54 communicates with the lubricating oil port 52, and the front end of the lubricating oil passage 54 communicates with an internal space defined inside the clutch hub 26. An annular lubricating oil distributing member 56 is fixed to the front surface of the pressure plate 22. The lubricating oil distributing member 56 has a frustoconical shape in cross section so as to be diverged toward its front end (left end as viewed in FIG. 1), and functions to guide the lubricating oil supplied through the lubricating oil passage 54.

Figure 5:
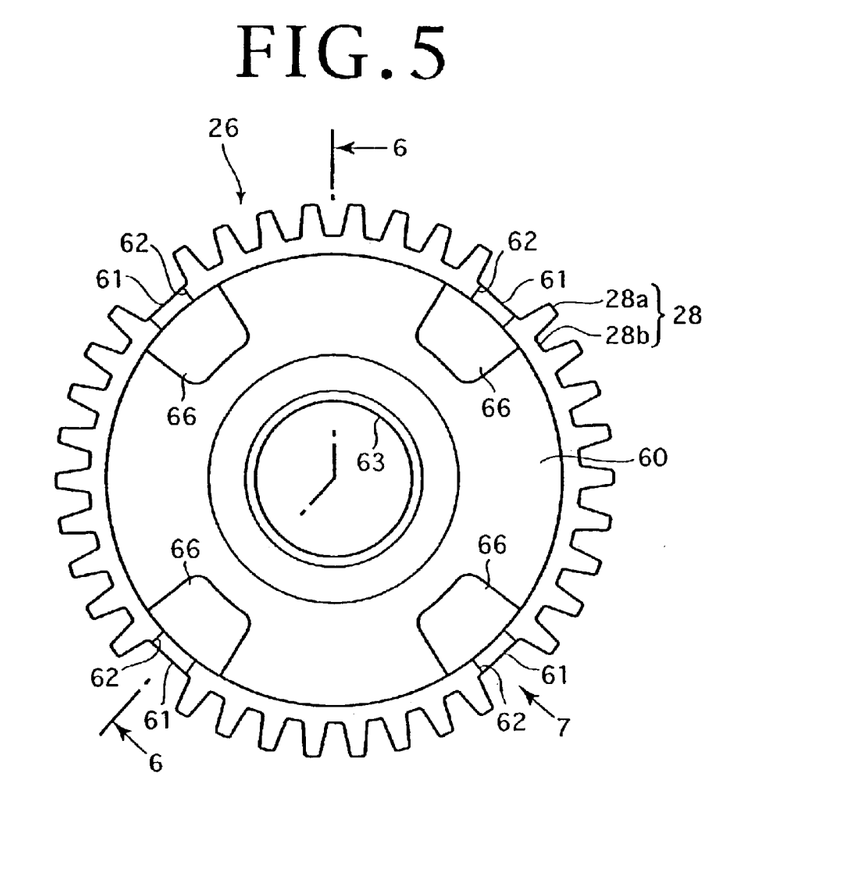
FIG. 5 is an elevational view of a clutch hub according to a first preferred embodiment of the present invention.
Figure 6:
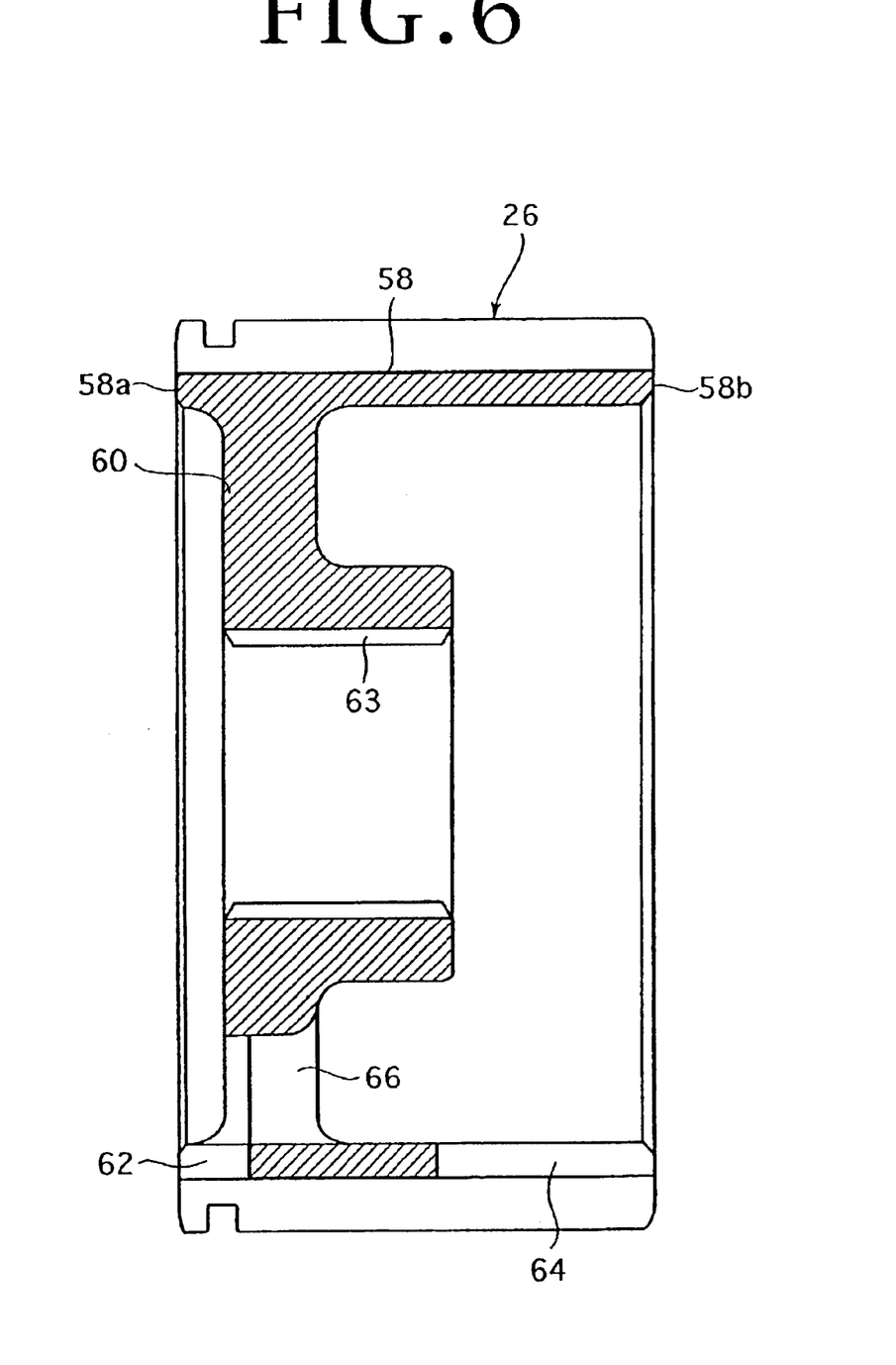
FIG. 6 is a cross section taken along the line 6—6 in FIG. 5.
Figure 7:
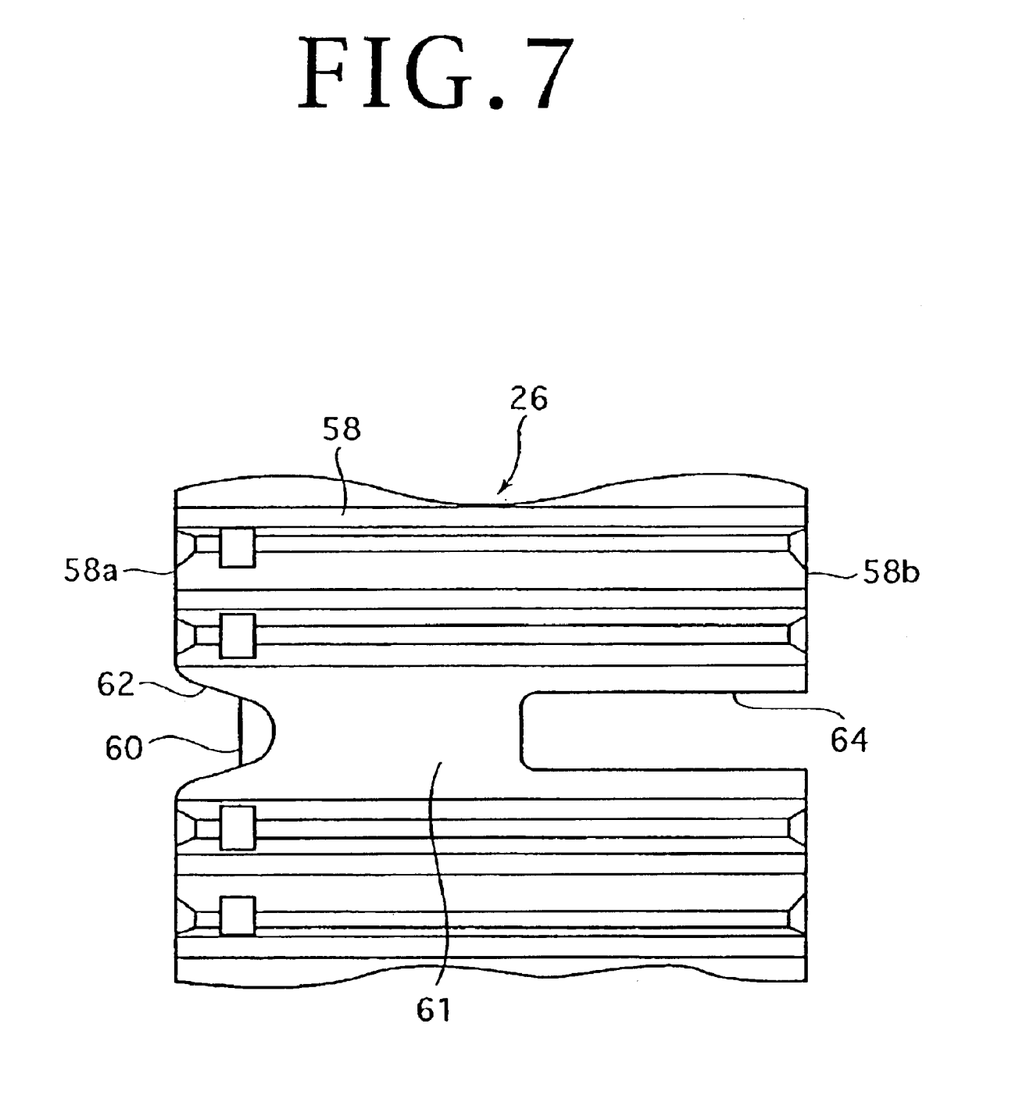
FIG. 7 is a partially cutaway, enlarged view taken in the direction of an arrow 7 in FIG. 5.

Referring to FIG. 5, there is shown an elevational view of the clutch hub 26 showing a first preferred embodiment of the present invention. FIG. 6 is a cross section taken along the line 6—6 in FIG. 5, and FIG. 7 is a partially cutaway, enlarged view taken in the direction of an arrow 7 in FIG. 5. The clutch hub 26 is composed of a cylindrical portion 58 having a first end 58a and a second end 58b, and a flange 60 formed integrally with the cylindrical portion 58 near the first end 58a (left end as viewed in FIG. 6). The spline 28 of the clutch hub 26 is formed on the outer circumference of the cylindrical portion 58, and it is composed of a plurality of spline teeth 28a and spline grooves 28b alternately formed. A spline 63 is formed on the inner circumference of the flange 60. The spline 63 is engaged with the spline 24 of the output shaft 8.

As shown in FIG. 1, a snap ring 72 is mounted on the outer circumference of the cylindrical portion 58 of the clutch hub 26, so as to prevent undue disengagement of the clutch plates 30 from the clutch hub 26. The outer circumference of the cylindrical portion 58 partially lacks the spline teeth 28a to form a plurality of (four in this preferred embodiment) untoothed portions 61 spaced in the circumferential direction. As best shown in FIG. 7, each untoothed portion 61 is formed with a recess 62 exposed to the first end 58a and a recess 64 exposed to the second end 58b and elongated in the axial direction. The recesses 64 constitute a plurality of first lubricating oil passages.

As apparent from FIGS. 5 and 6, a plurality of (four in this preferred embodiment) holes 66 are formed through the flange 60 so as to be spaced in the circumferential direction. The through holes 66 communicate with the recesses 62, respectively. The through holes 66 constitute a plurality of second lubricating oil passages, and the recesses 62 constitute a plurality of third lubricating oil passages. The clutch hub 26 is formed of sintered metal. For example, a mixture of 2 wt % of copper powder, 0.9 wt % of graphite, and 0.8 wt % of zinc stearate as a die lubricating agent in iron powder is used as a material powder. The material powder is filled into a die and compacted at a density of 6.6 to 7.0 g/cm³. The compacted powder is next sintered at 1120° C. for 20 minutes in an atmosphere of nitrogen, thus producing the clutch hub 26.

In this preferred embodiment, the recesses 62 and 64 and the through holes 66 can be formed by axial ejection from the die. Accordingly, the recesses 62 and 64 and the through holes 66 can be formed simultaneously with the production of the clutch hub 26 by sinter metallurgy (powder metallurgy). Accordingly, any additional working steps such as drilling are not necessary after the production of the clutch hub 26, so that the clutch hub 26 can be easily manufactured. Further, since the clutch hub 26 is manufactured by sinter metallurgy, a sufficiently high dimensional accuracy can be ensured.

The positions and total sectional area of the recesses 62 and 64 formed at the untoothed portions 61 and the positions and total sectional area of the through holes 66 formed through the flange 60 are optimized so that a sufficient amount of lubricating oil can be supplied uniformly to all the clutch plates 20 and 30. Further, the ratio of the area of the recesses 64 to the area of the inner circumferential surface of the cylindrical portion 58 on one axial side with respect to the flange 60 (on the second end 58b side) is set smaller than the ratio of the area of the recesses 62 to the area of the inner circumferential surface of the cylindrical portion 58 on the other axial side with respect to the flange 60 (on the first end 58a side). With this configuration, the lubricating oil can be easily supplied to the clutch plates 20 and 30 on the left side of the flange 60 (on the first end 58a side), so that a sufficient amount of lubricating oil can be supplied uniformly to all the clutch plates 20 and 30.

In this preferred embodiment, the clutch piston 34 and the thrust bearing 36 constitute clutch engaging means. The first and second hydraulic pumps 44 and 46, the lubricating oil passage 54, and the lubricating oil distributing member 56 constitute lubricating oil supplying means.

The operation of the preferred embodiment mentioned above will now be described. At starting of the vehicle, the drive force of the engine is transmitted to the front wheels, and also drives the first hydraulic pump 44 through the input shaft 6. At this time, the hydraulic clutch 14 is in a disengaged condition, so that the second hydraulic pump 46 connected to the output shaft 8 is at rest. Accordingly, there is a difference in discharge amount between the first hydraulic pump 44 and the second hydraulic pump 46, and the hydraulic clutch 14 is engaged by a hydraulic pressure generated according to the above difference. As a result, a part of the drive force of the engine is transmitted to the rear wheels to obtain a four-wheel drive condition of the vehicle.

When the hydraulic clutch 14 is engaged to thereby distribute the drive force to the rear wheels as mentioned above, the discharge amount of the second hydraulic pump 46 connected to the output shaft 8 increases with an increase in rotational speed of the rear wheels, and the difference in rotational speed between the front wheels and the rear wheels soon becomes substantially zero. For example, when the vehicle becomes a constant-speed running condition, the difference in discharge amount between the first and second hydraulic pumps 44 and 46 becomes zero. As a result, no hydraulic pressure is applied to the operating oil pressure chamber 37 of the hydraulic clutch 14, and the distribution of the drive force to the rear wheels is therefore cut to obtain a front-wheel drive condition of the vehicle.

In the case that only the front wheels come into contact with a road surface having a low coefficient of friction during constant-speed running of the vehicle, or in the case that the vehicle is rapidly accelerated, the front wheels may cause a transient slip. In such a condition, the discharge amount of the first hydraulic pump 44 connected to the input shaft 6 exceeds the discharge amount of the second hydraulic pump 46 connected to the output shaft 8, so that the hydraulic clutch 14 is engaged for the above reason to thereby distribute the drive force to the rear wheels.

A part of the discharge amounts of the first and second hydraulic pumps 44 and 46 is supplied from the lubricating oil port 52 of the central plate 38 to the outer circumference of the output shaft 8. The lubricating oil supplied to the outer circumference of the output shaft 8 flows toward the hydraulic clutch 14 along the lubricating oil passage 54 formed between the outer circumference of the output shaft 8 and the inner circumference of the pump driving member 48 to reach the internal space of the clutch hub 26 of the hydraulic clutch 14. The lubricating oil supplied to the internal space of the clutch hub 26 is guided leftward as viewed in FIG. 1 along the inner circumferential surface of the lubricating oil distributing member 56 rotating with the pressure plate 22. The lubricating oil thus guided is scattered radially outward by a centrifugal force due to the rotation of the clutch hub 26 to collide with the inner circumferential surface of the cylindrical portion 58 and be diffused therealong.

A part of the lubricating oil thus diffused is passed through the recesses 64 of the cylindrical portion 58 of the clutch hub 26 and is supplied to the clutch plates 20 and 30 on the right side of the flange 60 as viewed in FIG. 1. The remaining lubricating oil is passed through the through holes 66 of the flange 60 to reach the back side (left side) of the flange 60. This lubricating oil is scattered radially outward by the centrifugal force and is supplied through the recesses 62 and the lubricating oil passage 67 to the clutch plates 20 and 30 on the left side of the flange 60 as viewed in FIG. 1.

As mentioned above, the cylindrical portion 58 of the clutch hub 26 has the recesses 62 and 64, and the flange 60 of the clutch hub 26 has the through holes 66. Accordingly, the lubricating oil scattered by the centrifugal force to collide with the inner circumferential surface of the cylindrical portion 58 of the clutch hub 26 and be diffused therealong can be introduced through the recesses 62 and 64 and the through holes 66 to all the clutch plates 20 and 30. As a result, the sliding contact surfaces of all the clutch plates 20 and 30 can be lubricated uniformly and sufficiently.

Figure 8:
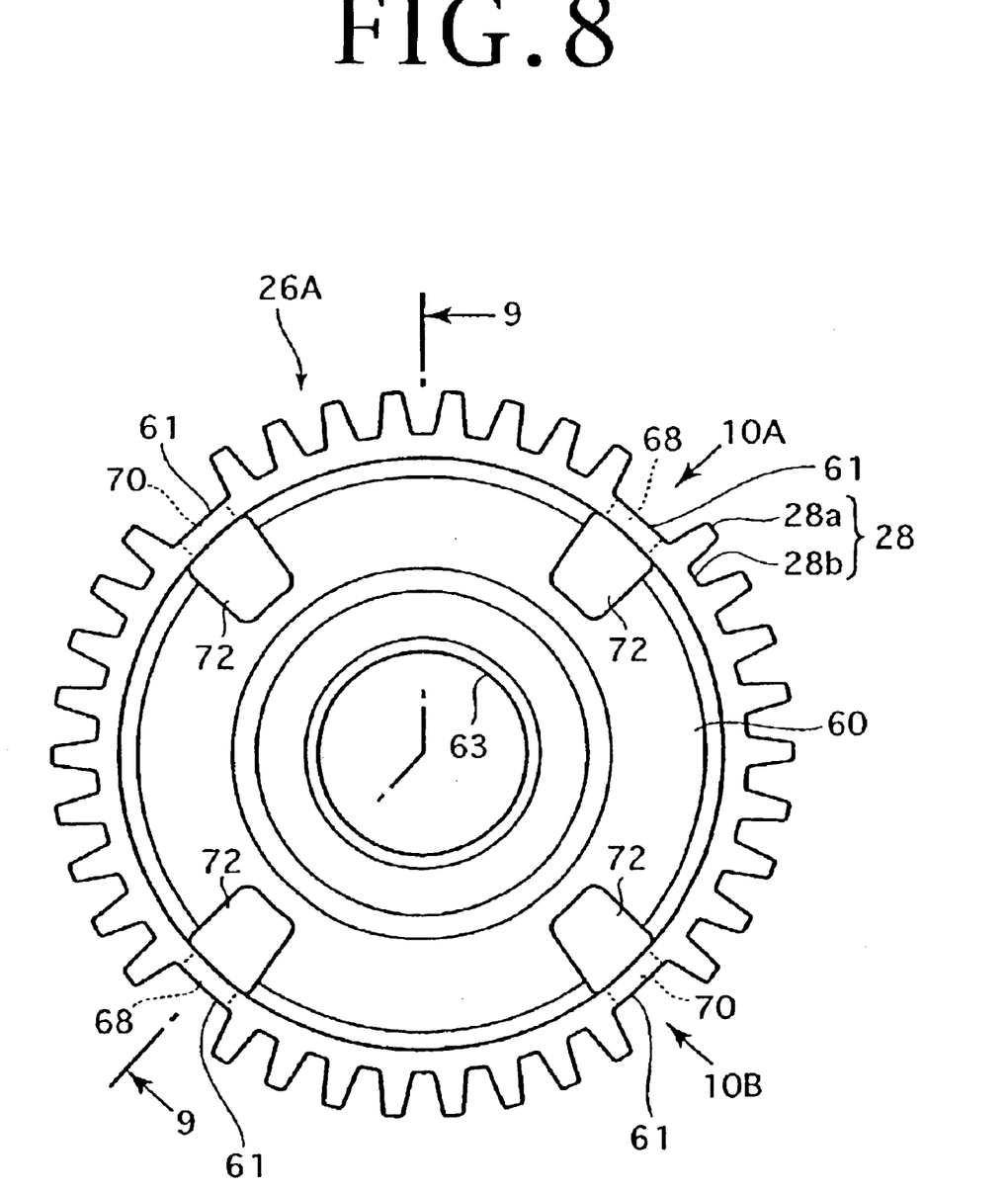
FIG. 8 is an elevational view of a clutch hub according to a second preferred embodiment of the present invention.
Figure 9:
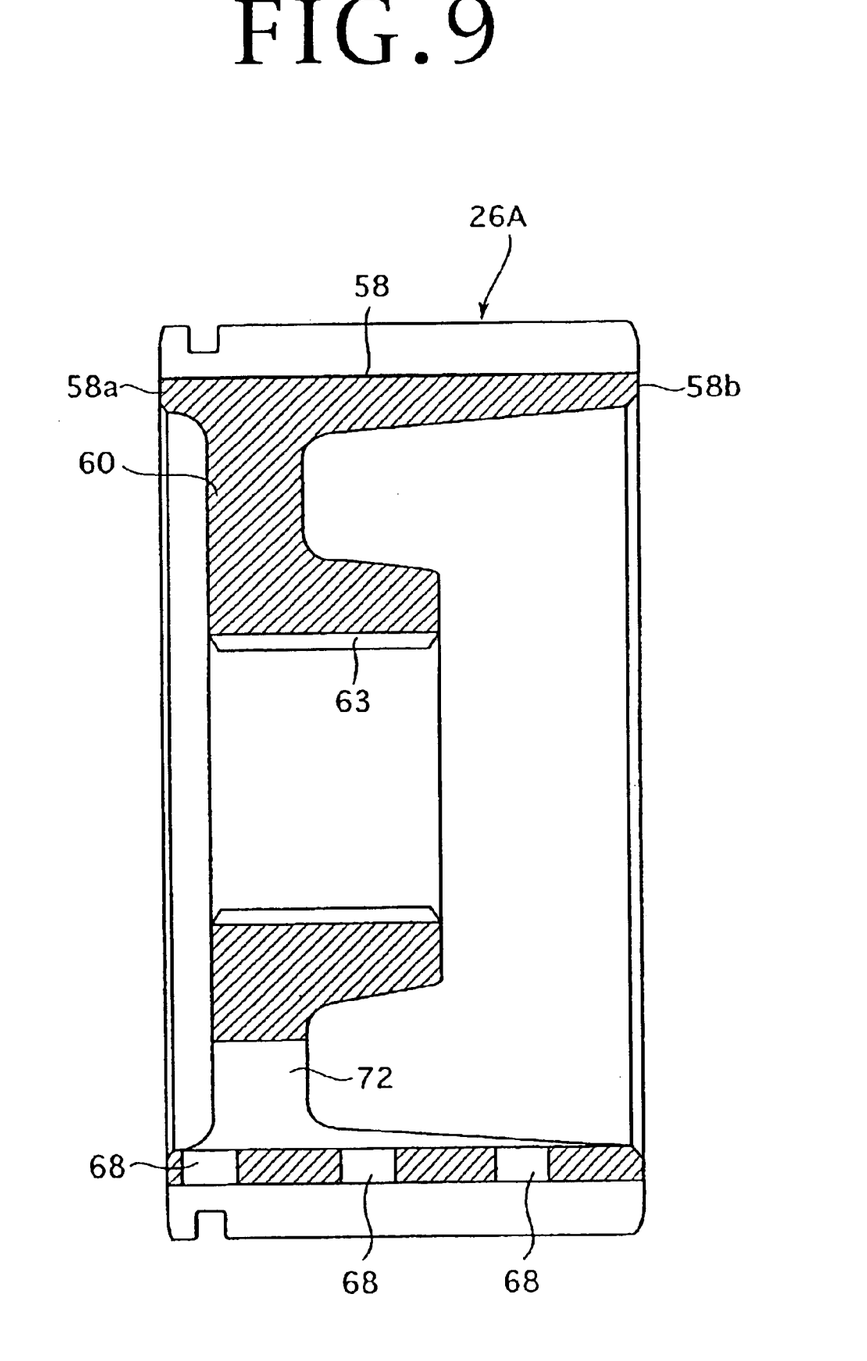
FIG. 9 is a cross section taken along the line 9—9 in FIG. 8.
Figure 10A:
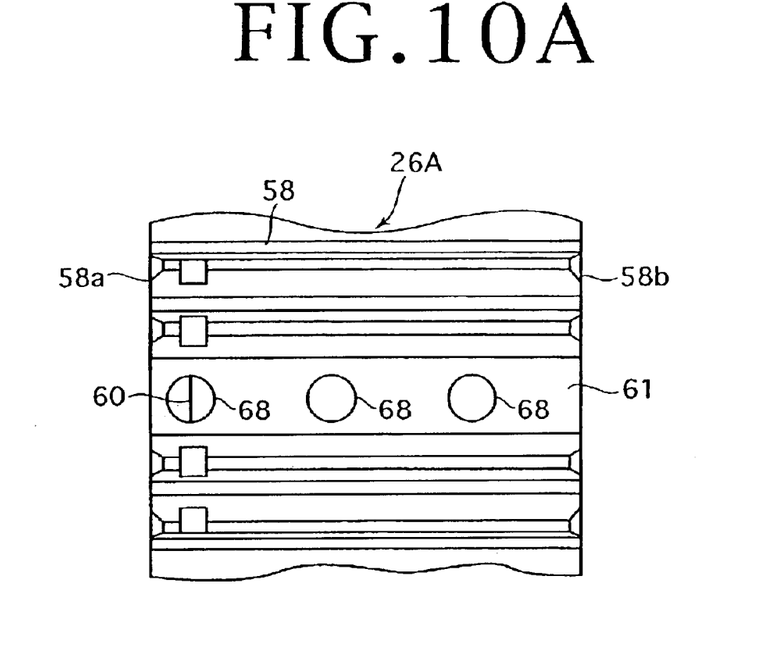
FIG. 10A is a partially cutaway, enlarged view taken in the direction of an arrow 10A in FIG. 8.
Figure 10B:
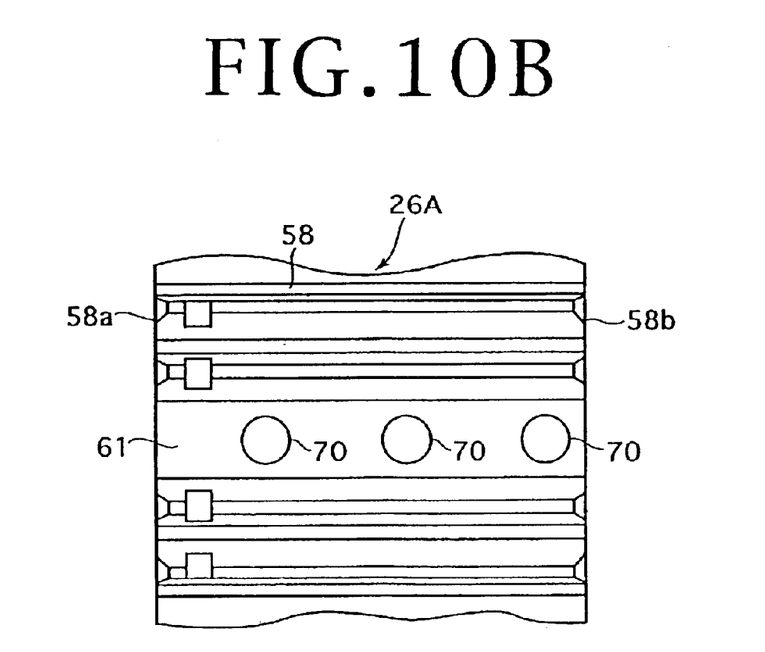
FIG. 10B is a partially cutaway, enlarged view taken in the direction of an arrow 10B in FIG. 8.

Referring next to FIG. 8, there is shown an elevational view of a clutch hub 26A according to a second preferred embodiment of the present invention. FIG. 9 is a cross section taken along the line 9—9 in FIG. 8. FIG. 10A is a partially cutaway, enlarged view taken in the direction of an arrow 10A in FIG. 8, and FIG. 10B is a partially cutaway, enlarged view taken in the direction of an arrow 10B in FIG. 8. Like the clutch hub 26 according to the first preferred embodiment, the clutch hub 26A has a cylindrical portion 58 formed with a plurality of (four in this preferred embodiment) untoothed portions 61 spaced in the circumferential direction.

As shown in FIG. 10A, one of the four untoothed portions 61 of the cylindrical portion 58 is formed with a series of three through holes 68 shifted toward the first end 58a. Similarly, the untoothed portion 61 located radially opposite to the untoothed portion 61 shown in FIG. 10A is formed with a series of three through holes 68 shifted toward the first end 58a as shown in FIG. 10A. On the other hand, as shown in FIG. 10B, the untoothed portion 61 located circumferentially adjacent to the untoothed portion 61 shown in FIG. 10A is formed with a series of three through holes 70 shifted toward the second end 58b. Similarly, the untoothed portion 61 radially opposite to the untoothed portion 61 shown in FIG. 10B is formed with a series of three through holes (not shown) shifted toward the second end 58b.

Thus, the plural untoothed portions 61 of the clutch hub 26A according to the second preferred embodiment are grouped into a first group having the through holes 68 and a second group having the through holes 70. The untoothed portions 61 of the first group and the untoothed portions 61 of the second group are alternately arranged in the circumferential direction, and the axial positions of the through holes 68 are different from the axial positions of the through holes 70. With this arrangement, the lubricating oil can be supplied uniformly to the outer circumference of the cylindrical portion 58.

As shown in FIG. 8, the flange 60 of the clutch hub 26A is formed with a plurality of (four in this preferred embodiment) through holes 72 spaced in the circumferential direction. As apparent from FIG. 9, the through hole 68 nearest to the first end 58a in each untoothed portion 61 of the first group communicates with the corresponding through hole 72 of the flange 60. The positions and total sectional area of the through holes 68 and 70 formed at the untoothed portions 61 and the positions and total sectional area of the through holes 72 formed through the flange 60 are optimized so that the lubricating oil can be supplied uniformly and sufficiently to the sliding contact surfaces of all the clutch plates 20 and 30.

In this preferred embodiment, the through holes 68 and 70 constitute a plurality of first lubricating oil passages, the through holes 72 constitute a plurality of second lubricating oil passages, and the through holes 68 communicating with the through holes 72 constitute a plurality of third lubricating oil passages. Like the clutch hub 26 according to the first preferred embodiment, the clutch hub 26A is manufactured by sinter metallurgy. The through holes 72 of the flange 60 can be formed simultaneously with the formation of the clutch hub 26A by the use of a die. On the other hand, the through holes 68 and 70 of the cylindrical portion 58 are formed by drilling after the formation of the clutch hub 26A by sinter metallurgy.

The operation of the clutch hub 26A according to the second preferred embodiment is substantially similar to that of the clutch hub 26 according to the first preferred embodiment. That is, the lubricating oil can be supplied uniformly and sufficiently to the sliding contact surfaces of all the clutch plates 20 and 30.

Figure 11:
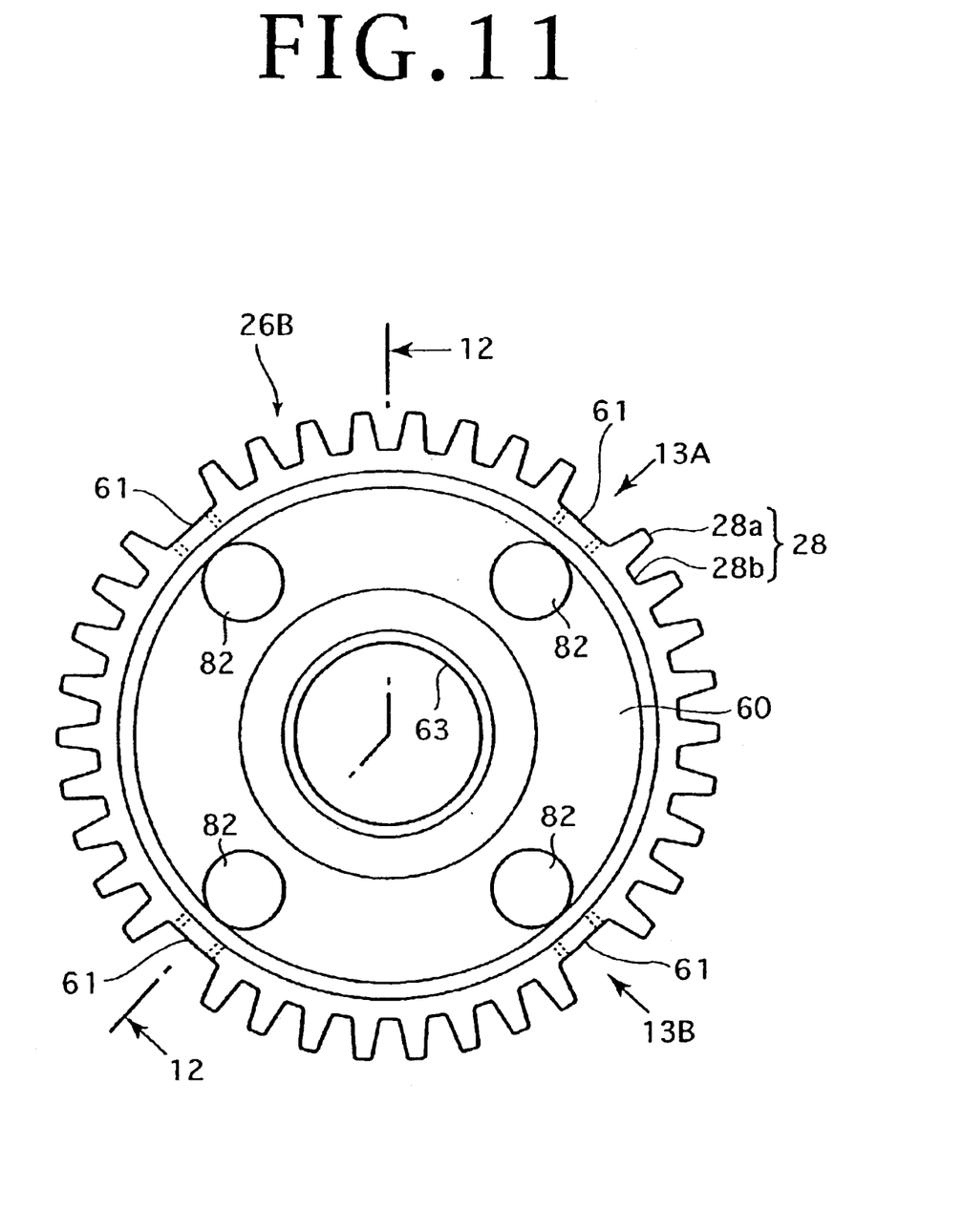
FIG. 11 is an elevational view of a clutch hub according to a third preferred embodiment of the present invention.
Figure 12:
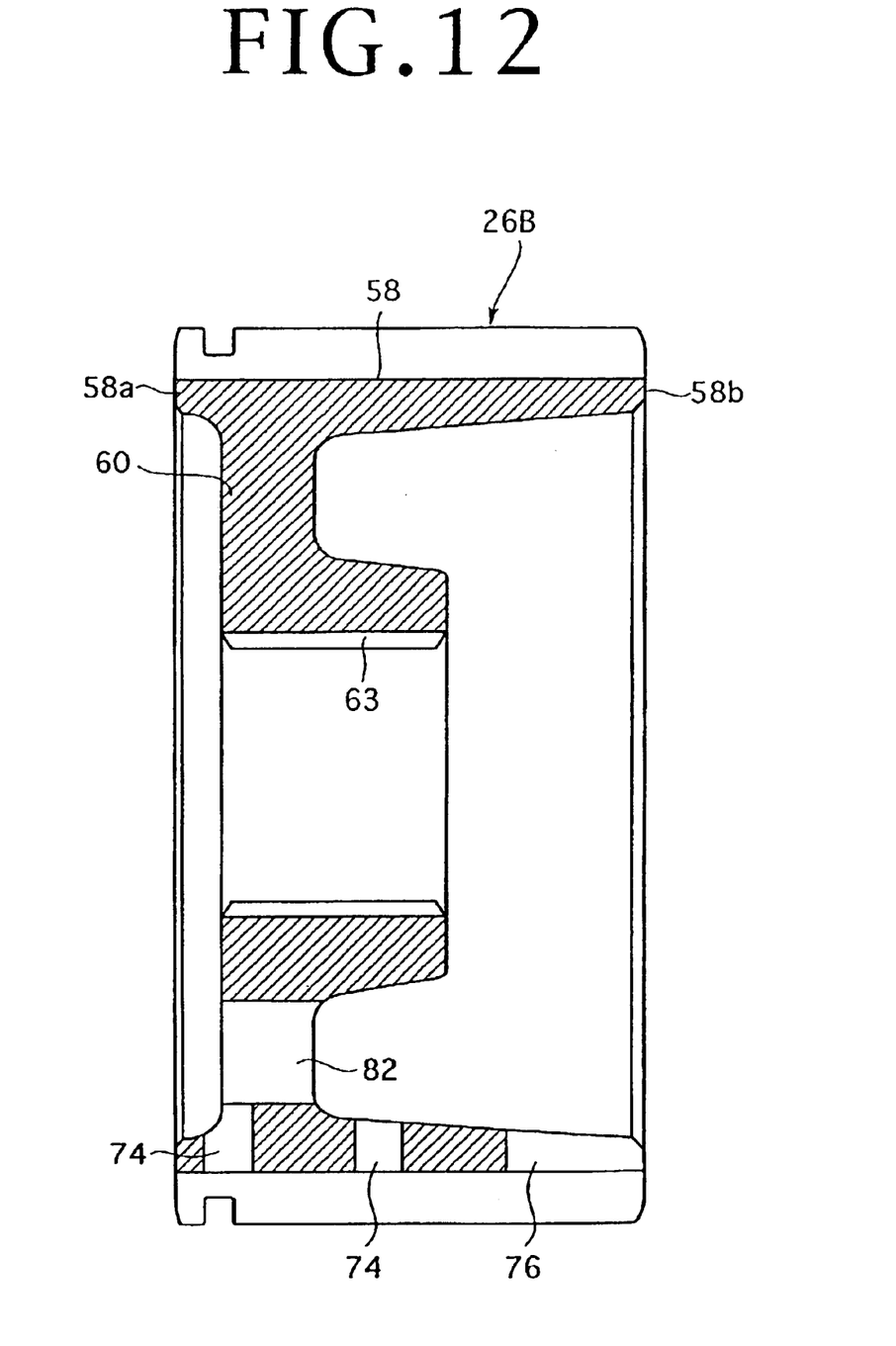
FIG. 12 is a cross section taken along the line 12—12 in FIG. 1.
Figure 13A:
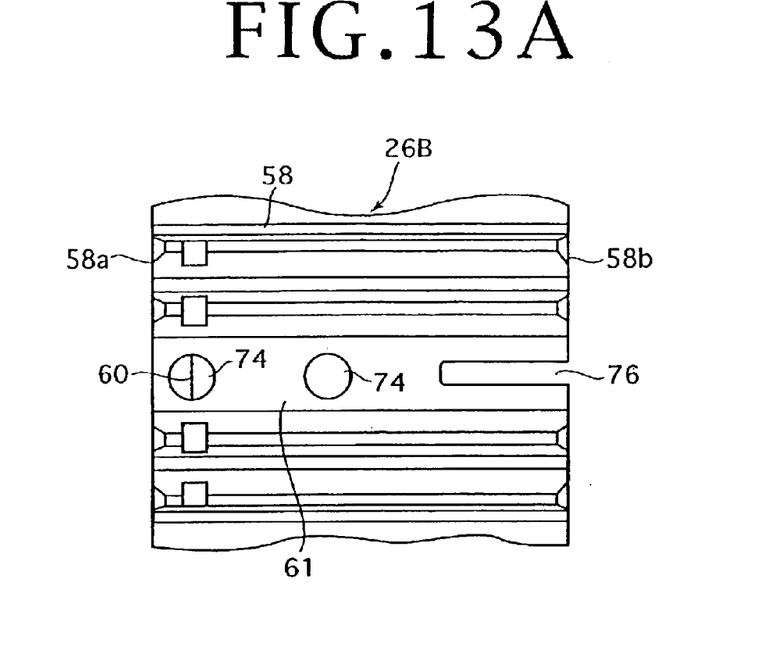
FIG. 13A is a partially cutaway, enlarged view taken in the direction of an arrow 13A in FIG. 11.
Figure 13B:
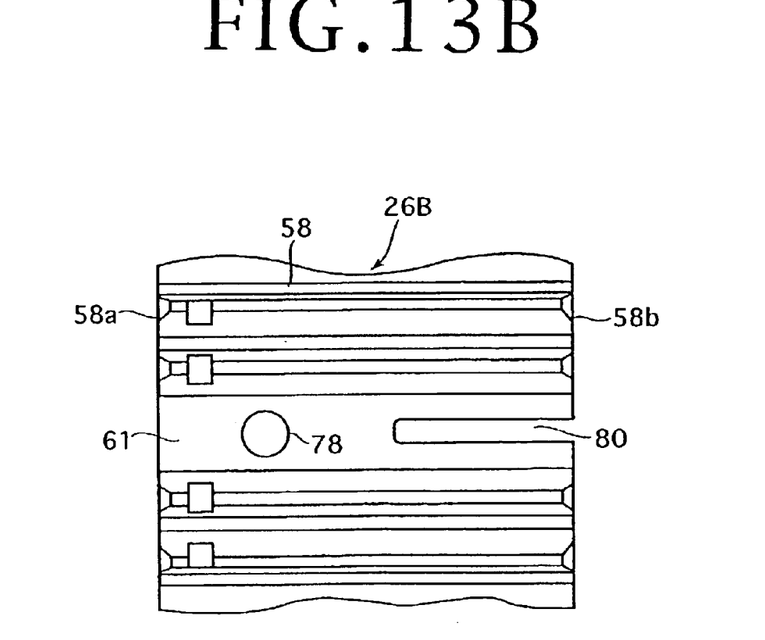
FIG. 13B is a partially cutaway, enlarged view taken in the direction of an arrow 13B in FIG. 11.

Referring next to FIG. 11, there is shown an elevational view of a clutch hub 26B according to a third preferred embodiment of the present invention. FIG. 12 is a cross section taken along the line 12—12 in FIG. 11. FIG. 13A is a partially cutaway, enlarged view taken in the direction of an arrow 13A in FIG. 11, and FIG. 13B is a partially cutaway, enlarged view taken in the direction of an arrow 13B in FIG. 11. As shown in FIG. 13A, one of the untoothed portions 61 is formed with two through holes 74 and a recess 76 exposed to the second end 58b and elongated in the axial direction. Similarly, the untoothed portion 61 radially opposite to the untoothed portion 61 shown in FIG. 13A is formed with two through holes 74 and a recess 76 as shown in FIG. 12.

On the other hand, as shown in FIG. 13B, the untoothed portion 61 circumferentially adjacent to the untoothed portion 61 shown in FIG. 13A is formed with a through hole 78 and a recess 80 exposed to the second end 58b and elongated in the axial direction. Similarly, the untoothed portion 61 radially opposite to the untoothed portion 61 shown in FIG. 13B is formed with a through hole and a recess (not shown). As shown in FIG. 11, the flange 60 of the clutch hub 26B is formed with a plurality of (four in this preferred embodiment) through holes 82 spaced in the circumferential direction. As shown in FIG. 12, the through hole 74 nearest to the first end 58*a* in each corresponding untoothed portion 61 communicates with the corresponding through hole 82 of the flange 60.

Like the clutch hubs 26 and 26A according to the first and second preferred embodiments, the clutch hub 26B is manufactured by sinter metallurgy. The recesses 76 and 80 of the cylindrical portion 58 and the through holes 82 of the flange 60 can be formed simultaneously with the formation of the clutch hub 26B by the use of a die. On the other hand, the through holes 74 and 78 of the cylindrical portion 58 are formed by drilling after the formation of the clutch hub 26B by sinter metallurgy. Also in this preferred embodiment, the positions and total sectional area of the recesses 76 and 80 and the through holes 74 and 78 of the cylindrical portion 58 and the positions and total sectional area of the through holes 82 of the flange 60 are optimized so that the lubricating oil can be supplied uniformly and sufficiently to the sliding contact surfaces of all the clutch plates 20 and 30.

In this preferred embodiment, the through holes 74 and 78 and the recesses 76 and 80 constitute a plurality of first lubricating oil passages, the through holes 82 constitute a plurality of second lubricating oil passages, and the through holes 74 communicating with the through holes 82 constitute a plurality of third lubricating oil passages.

The operation of the clutch hub 26B according to the third preferred embodiment is substantially similar to that of the clutch hubs 26 and 26A according to the first and second preferred embodiments. That is, the lubricating oil can be supplied uniformly and sufficiently to the sliding contact surfaces of all the clutch plates 20 and 30.

According to the present invention as described above, a part of the lubricating oil scattered by the centrifugal force of the rotating clutch hub to collide with the inner circumferential surface of the cylindrical portion of the clutch hub and be diffused therealong can be supplied through the recesses or through holes formed through the cylindrical portion to the sliding contact surfaces of the clutch plates on one axial side with respect to the flange of the clutch hub, and the remaining part of the lubricating oil can be supplied through the through holes formed through the flange to the sliding contact surfaces of the clutch plates on the other axial side with respect to the flange. Accordingly, the sliding contact surfaces of all the clutch plates can be uniformly lubricated.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A lubricating structure of a hydraulic clutch comprising:

a drum-shaped clutch housing connected to a first rotating shaft, said clutch housing having a first spline formed on the inner circumference thereof;

a clutch hub connected to a second rotating shaft coaxial with said first rotating shaft, said clutch hub having a cylindrical portion having a first end and a second end, a flange formed integrally with said cylindrical portion near said first end, and a second spline formed on the outer circumference of said cylindrical portion;

a plurality of first clutch plates axially slidably engaged with said first spline of said clutch housing;

a plurality of second clutch plates axially slidably engaged with said second spline of said clutch hub;

clutch engaging means for engaging said first and second clutch plates with each other; and lubricating oil supplying means for supplying a lubricating oil into an internal space defined inside of said cylindrical portion of said clutch hub from the side of said second end;

said cylindrical portion of said clutch hub having a plurality of first lubricating oil passages for radially outwardly introducing said lubricating oil from the inner circumference of said cylindrical portion to the outer circumference thereof, said first lubricating oil passages comprising a plurality of first recesses extending axially from the second end of said cylindrical portion toward the first end thereof;

said flange of said clutch hub having a plurality of second lubricating oil passages for axially introducing said lubricating oil from said internal space toward said first end of said cylindrical portion.

2. A lubricating structure according to claim 1, wherein said clutch hub is formed of sintered metal.

3. A lubricating structure according to claim 1, wherein said cylindrical portion of said clutch hub further has a plurality of third lubricating oil passages for radially outwardly introducing said lubricating oil passed through said second lubricating oil passages to the outer circumference of said cylindrical portion;

the ratio of the area of said first lubricating oil passages to the area of the inner circumferential surface of said cylindrical portion on the side of said second end with respect to said flange being smaller than the ratio of the area of said third lubricating oil passages to the area of the inner circumferential surface of said cylindrical portion on the side of said first end with respect to said flange.

4. A lubricating structure according to claim 3, wherein said third lubricating oil passages comprise second recesses extending axially from the first end of said cylindrical portion toward the second end thereof.

5. A lubricating structure according to claim 4, wherein said second recesses are formed by axial ejection from a die.

6. A lubricating structure according to claim 1, wherein said first recesses are formed by axial ejection from a die.

7. A lubricating structure according to claim 6, wherein said second oil passages are formed by axial ejection from said die.

8. A lubricating structure according to claim 1, wherein said cylindrical portion of said clutch hub further has a plurality of third lubricating oil passages for radially outwardly introducing said lubricating oil passed through said second lubricating oil passages to the outer circumference of said cylindrical portion; and each of said first, second and third lubricating oil passages are formed in line with each other.

* * * * *